United States Patent
Wang (10) Patent No.: US 9,238,735 B2
(45) Date of Patent: Jan. 19, 2016

(54) COPPER CONTAINING INFRARED REFLECTIVE PIGMENT COMPOSITIONS

(75) Inventor: Lei Wang, Washington, PA (US)

(73) Assignee: Ferro Corporation, Mayfield Heights, OH (US)

(*) Notice: Subject to any disclaimer, the term of this patent is extended or adjusted under 35 U.S.C. 154(b) by 123 days.

(21) Appl. No.: 14/110,926

(22) PCT Filed: May 9, 2012

(86) PCT No.: PCT/US2012/036987
§ 371 (c)(1),
(2), (4) Date: Nov. 6, 2013

(87) PCT Pub. No.: WO2012/154766
PCT Pub. Date: Nov. 15, 2012

(65) Prior Publication Data
US 2014/0057112 A1   Feb. 27, 2014

Related U.S. Application Data

(60) Provisional application No. 61/484,248, filed on May 10, 2011.

(51) Int. Cl.
   C09B 67/22    (2006.01)
   C01G 9/00     (2006.01)
   C01G 23/00    (2006.01)
   C01G 25/00    (2006.01)
   C01G 29/00    (2006.01)
   C01G 30/00    (2006.01)
   C09C 1/00     (2006.01)

(52) U.S. Cl.
   CPC ............ *C09B 67/0033* (2013.01); *C01G 9/006* (2013.01); *C01G 23/002* (2013.01); *C01G 25/006* (2013.01); *C01G 29/006* (2013.01); *C01G 30/002* (2013.01); *C09C 1/0081* (2013.01); *C01P 2004/80* (2013.01); *Y10T 428/2982* (2015.01)

(58) Field of Classification Search
   None
   See application file for complete search history.

(56) References Cited

U.S. PATENT DOCUMENTS

| 4,443,265 | A |   | 4/1984  | Fischer et al. |
| 4,983,736 | A | * | 1/1991  | Doumaux et al. ............ 544/402 |
| 5,164,497 | A | * | 11/1992 | King et al. ........................ 544/87 |
| 5,202,489 | A | * | 4/1993  | Doumaux et al. ............ 564/479 |
| 2007/0234759 | A1 | * | 10/2007 | Sakoske et al. ................ 65/33.1 |

FOREIGN PATENT DOCUMENTS

| DE | 3140914  | 5/1983 |
| SU | 566785   | 8/1977 |
| SU | 1623951  | 1/1991 |

OTHER PUBLICATIONS

Patent Abstract for JP Publication No. 58-196269 published Nov. 15, 1983, one page.
International Search Report for corresponding PCT/US2012/036987 mailed Aug. 16, 2012, three pages.

* cited by examiner

*Primary Examiner* — Ronak Patel
(74) *Attorney, Agent, or Firm* — Rankin, Hill & Clark LLP (57) ABSTRACT

Pigment compositions are described that advantageously increase total solar reflectance. Also described are methods of making pigment compositions. The pigment compositions can contain copper oxide; copper antimony oxides, copper bismuth oxides, or combinations thereof; and alkaline earth metal oxides, early-transition metal oxides, post-transition metal oxides, metalloid (semi-metal) oxides, rare-earth metal oxides, or combinations thereof.

6 Claims, 5 Drawing Sheets

COPPER CONTAINING INFRARED REFLECTIVE PIGMENT COMPOSITIONS

TECHNICAL FIELD

The subject disclosure generally relates to pigment compositions and method of making pigment compositions.

BACKGROUND

Pigments are widely used in various applications such as paints, inks, plastics, rubbers, ceramics, enamels, and glasses. Inorganic colored pigments are based upon crystalline materials comprised of oxides of mixed metals. There are various reasons for using inorganic pigments. Among these are the coloristic properties of the pigments, their visible as well as ultraviolet (UV) and infrared (IR) reflectance characteristics, their light fastness and their high temperature stability. The high temperature stability is necessary when the objects being colored are formed at elevated temperatures.

Pigments exhibit certain colors because they selectively reflect and absorb certain wavelengths of light. White light is an approximately equal mixture of the entire visible spectrum of light. When white light encounters a colored pigment, some wavelengths are absorbed as they interact with the electronic structure of the pigment. These interactions are determined by the chemistry and bonding of the pigment. The wavelengths not absorbed are reflected back to the observer, and this reflected visible light spectrum creates the appearance of a color. For example, ultramarine reflects blue light, typically between 400 and 500 nanometers in wavelength, and absorbs visible light of other wavelengths.

The appearance of pigments is also dependant upon the spectrum of the source light. Sunlight has a high color temperature, and a fairly uniform spectrum, and is considered a standard for white light. Artificial light sources, including fluorescent light, tend to have great peaks in some regions of their spectrum, and deep valleys in other regions. Viewed under these conditions, pigments may exhibit different colors.

A large number complex inorganic color pigments (CICPs) are copper-containing pigments. Examples of copper-containing blacks include C.I. Pigments, Black 26, Black 27, Black 28, and Black 30. All of these blacks have spinel crystal structure. Copper chromite blacks (C.I. Pigments Black 28) are spinels made from copper (II) oxide and chromium (III) oxide green, with a general formula of $CuCr_2O_4$. Copper chromites are the most widely used CICP blacks. The copper chromite blacks are general-purpose pigments with durability and temperature resistance. Copper chromite blacks generally provide dark-tone color as well as strong absorption in near IR region. The copper chromite blacks are excellent UV absorbers, and offer good UV opacity to the systems that employ them. Red-colored Cuprous oxide ($Cu_2O$) is commonly used as a pigment, a fungicide, and an antifouling agent for marine paints. The black Cupric oxide is used as a pigment in ceramics to produce blue, red, and green (and sometimes gray, pink, or black) glazes.

According to the definition of CPMA (Color Pigments Manufacturers Association), for the pigments with yellow hue, there are several yellow, buff or brown pigment families. Most of them are titanate compounds doped with transition metals with rutile crystal structure, such as Nickel Antimony Titanium Yellow (Yellow 53), Chrome Antimony Titanium Buff (Brown 24) and Nickel Niobium Titanium Yellow (Yellow 161), etc. To our best knowledge, there is no reported copper-containing yellow pigment. There are also other copper containing pigments, such as Egyptian Blue: a synthetic pigment of calcium copper silicate ($CaCuSi_4O_{10}$), Han Blue ($BaCuSi_4O_{10}$), Paris Green:Copper(II) acetoarsenite ($Cu(C_2H_3O_2)_2 \cdot 3Cu(AsO_2)_2$) and Scheele's Green:Copper arsenite $CuHAsO_3$ and some blue and green organic pigments, such as Copper Phthalocyanine and its derivatives.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In accordance with one aspect, a dark-tone colored pigment composition is provided. More particularly, in accordance with this aspect, the dark-tone colored pigment composition includes copper oxides; copper antimony oxides, copper bismuth oxides, or combinations thereof; and alkaline earth metal oxides, early-transition metal oxides, post-transition metal oxides, metalloid oxides (e.g., semi-metal oxides), rare-earth metal oxides, or combinations thereof. The pigment composition can exhibit a total solar reflectance of about 15% or more.

In accordance with another aspect, a light-tone pigment composition with yellow and green hue is provided. More particularly, in accordance with this aspect, the yellowish pigment compositions contain magnesium oxides; crystalline complex oxide composites; and amorphous oxide composites. The crystalline complex oxide includes one or multiple crystalline phases of copper-magnesium-antimony oxides ($Cu_3MgSb_{1.6}O_{6-\delta}$ for example) and their bismuth solid solution derivatives, copper antimony oxides ($CuSb_2O_6$ for example) and their bismuth solid solution derivatives, magnesium antimony oxides ($MgSb_2O_4$ or $MgSb_2O_6$ for example) and their bismuth solid solution derivatives. The amorphous oxide composite includes at least one selected form the group consisting of antimony oxides and bismuth oxides and at least one selected from the group consisting of alkaline earth metal oxides, early-transition metal oxides, post-transition metal oxides, metalloid oxides (e.g., semi-metal oxides), and rare-earth metal oxides. The pigment composition can exhibit a total solar reflectance of about 45% or more.

In accordance with another aspect, another colored pigment composition is provided. More particularly, in accordance with this aspect, the colored pigment composition has the formula $CuO \cdot (A)_x \cdot B_y$, where x=0.01-2; y=0.01-2; A is antimony oxides, bismuth oxides, or combinations thereof; B is oxides of Mg, Ca, Sr, Ba, Ti, Zr, Zn, Al, Si, B, Ce, or combinations thereof.

In accordance with yet another aspect, another colored pigment composition is provided. More particularly, in accordance with this aspect, the colored pigment composition contains crystalline copper oxide and amorphous composites containing at least one selected form the group consisting of antimony oxides and bismuth oxides and at least one selected from the group consisting of alkaline earth metal oxides, early-transition metal oxides, post-transition metal oxides, metalloid oxides, and rare-earth metal oxides.

In accordance with still yet another aspect, a method of making a pigment composition is provided. More particularly, in accordance with this aspect, the method involves combining metal compounds containing copper, at least one of antimony and bismuth, and at least one selected from alkaline earth metals, early-transition metals, post-transition metals, metalloids (e.g., semi-metals), and rare-earth metals; and reacting the metal compounds to form a pigment composition, the pigment composition containing copper antimony oxides, copper bismuth oxides, or combinations thereof, and alkaline earth metal oxides, early-transition metal oxides, post-transition metal oxides, metalloid oxides, rare-earth metal oxides, or combinations thereof.

In accordance with another aspect, a two-step method for forming a pigment composition is provided. More particularly, in accordance with this aspect, the method involves a first step involving combining at least one of antimony and bismuth and at least one selected from alkaline earth metals, early-transition metals, post-transition metals, metalloids, and rare-earth metals to form first oxide compounds, and heating the first oxide compounds by a solid state reaction to form an oxide composite; and a second step involving combining copper oxides with the oxide composite to form a second oxide compounds, and heating the second oxide compounds by a solid state reaction to form the pigment composition.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention can be employed. Other objects, advantages and novel features of the invention will become apparent from the following detailed description of the invention when considered in conjunction with the drawings.

DETAILED DESCRIPTION

The subject pigment compositions can exhibit improved solar reflectance properties such that the pigment compositions reflect a relatively high proportion of light having a wavelength between 780 and 2500 nm, while reflecting a relatively low proportion of light having a wavelength between 250 and 780 nm, which shows either light-tone or dark-tone colors. These unique reflection characteristics enable the preferred pigment compositions to selectively reflect infrared (IR) radiation while not significantly reflecting light within the visible spectrum. Thus, the pigment compositions maintain their desired appearance and color, e.g., dark-tone color, black color, or light-tone color, while also reflecting significant amounts of IR radiation.

Pigment Compositions

The subject pigment compositions can include copper oxides; copper antimony oxides, copper bismuth oxides, or combinations thereof; and alkaline earth metal oxides, early-transition metal oxides, post-transition metal oxides, metalloid oxides, rare-earth metal oxides, or combinations thereof. In other words, the subject pigment compositions can include copper oxides; at least one selected from the group consisting of copper antimony oxides and copper bismuth oxides; and at least one selected from the group consisting of alkaline earth metal oxides, early-transition metal oxides, post-transition metal oxides, metalloid oxides, and rare-earth metal oxides. In another embodiment, the pigment compositions contain crystalline copper oxides and amorphous (non-crystalline) oxide composites containing at least one selected from the group consisting of antimony oxides and bismuth oxides and at least one selected from the group consisting of alkaline earth metal oxides, early-transition metal oxides, post-transition metal oxides, metalloid oxides, and rare-earth metal oxides. The copper oxides can include copper(I) oxides and copper(II) oxides.

In one embodiment, the pigment compositions contain a combination of copper antimony oxides and copper bismuth oxides with alkaline earth metal oxides, early-transition metal oxides, post-transition metal oxides, metalloid oxides, rare-earth metal oxides, or combinations thereof. In another embodiment, the pigment compositions consist essentially of copper antimony oxides with alkaline earth metal oxides, early-transition metal oxides, post-transition metal oxides, metalloid oxides, rare-earth metal oxides, or combinations thereof. In yet another embodiment, the pigment compositions consist essentially of copper bismuth oxides with alkaline earth metal oxides, early-transition metal oxides, post-transition metal oxides, metalloid oxides, rare-earth metal oxides, or combinations thereof. The combinations of such oxides can be undertaken so long as the basic and material properties of the pigment compositions are not affected, i.e., the color properties (e.g., dark-tone colors, black color, or light-tone colors) and the increased solar reflectance characteristics described herein.

The copper antimony oxides and the copper bismuth oxides are multi-cation oxide compounds of the formula $Cu_xD_yO_z$, wherein D is Sb or Bi; O is atomic oxygen; each x, z, and z can be independently a non-zero integer. In these embodiments, one or more compounds of the formula $Cu_xD_yO_z$ can include an atomic composition characterized by a ratio $Cu_x:D_y$. In one embodiment, a copper-antimony oxide can include an atomic composition having a ratio, near ends of a range, of about 0.05:0.95 (copper:antimony) or about 0.95:0.05 (copper:antimony) or ratios of copper/antimony or antimony/copper in between the ratio near the ends of the range. In another embodiment, a copper-bismuth oxide can include an atomic composition having a ratio, near ends of a range, of about 0.05:0.95 (copper:bismuth) or about 0.95:0.05 (copper:bismuth) or ratios of copper/bismuth or bismuth/copper in between the ratio near the ends of the range. That is, the copper antimony oxides or the copper bismuth oxides can include various two-cation oxides having atomic composition ratios with the relative concentration of each cation falling within the range of about 0.05 to about 0.95. Examples of copper antimony oxides include $CuSb_2O_6$. Examples of copper bismuth oxides include $CuBi_2O_4$.

In one embodiment, the pigment compositions contain combinations of the copper antimony oxides and the copper bismuth oxides. The pigment compositions can contain the copper antimony oxides and the copper bismuth oxides in particular molar ratios, for example, in a range of Sb:Bi molar ratios, such as from about 10:1 to about 1:10, respectively. In another embodiment, the pigment compositions contain the copper antimony oxides and the copper bismuth oxides with a range of molar ratios of from about 9:1 to about 1:9 or with a range of molar ratios of from 5:1 to 1:5. Depending upon the particular application, it may be desirable to utilize the copper antimony oxides and the copper bismuth oxides in amounts corresponding to molar ratios of Sb:Bi of about 1:1, 2:1, 3:1, 4:1, 5:1, 1:2, 1:3, 1:4 and 1:5. All molar ratios expressed herein are with regard to molar amounts of antimony (Sb) to bismuth (Bi), unless otherwise indicated.

The pigment compositions can further contain alkaline earth metal oxides, early-transition metal oxides, post-transition metal oxides, metalloid oxides (e.g., semi-metal oxides), rare-earth metal oxides, or combinations thereof. Alkaline earth metals are a series of elements selected from Group 2 of the IUPAC Periodic Table of the Elements. Examples of alkaline earth metals include Mg, Ca, Sr, and Ba. In one embodiment, the pigment compositions contain oxides of Mg, Ca, Sr, Ba, or combinations thereof.

Early-transition metals are a series of elements selected from Groups 3-7 of the IUPAC Periodic Table of the Elements. Examples of early transition metals include Sc, Ti, Zr, Hf, Rf, V, Nb, Ta, Cr, Mo, W, Mn, Tc, and Re. In one embodiment, the pigment compositions contain oxides of Sc, Ti, Zr, Hf, Rf, V, Nb, Ta, Cr, Mo, W, Mn, Tc, Re, or combinations thereof. In one embodiment, the pigment compositions contain oxides of Ti, Zr, or combinations thereof.

Post-transition metals are a series of elements selected from Groups 12-15 of the IUPAC Periodic Table of the Elements. Examples of post-transition metals include Zn, Al, Ga, In, Sn, and Bi. In one embodiment, the pigment compositions contain oxides of Zn, Al, Ga, In, Sn, Bi, or combinations thereof. In another embodiment, the pigment compositions contain oxides of Zn, Al, or combinations thereof.

Metalloids (e.g., semi-metals) are a series of elements selected from Groups 13-16 of the IUPAC Periodic Table of the Elements. Examples of metalloids include B, Si, Ge, As, Sb, and Te. In one embodiment the pigment composition contain oxides of B, Si, Ge, As, Sb, Te, or combinations of thereof. In another embodiment, the pigment compositions contain oxides of B, Si, Sb, or combinations thereof.

Rare-earth metals are a series of elements selected from Group 3 of the IUPAC Periodic Table of Elements. Examples of rare-earth metals include Y, La, Ce, Pr, Nd, Pm, Sm, Eu, Gd, Tb, Dy, Ho, Er, Tm, Yb, Lu, Ac, Th, Pa, U, Np, Pu, Am, Cm, Bk, Cf, Es, Fm, Md, No, and Lr. In one embodiment, the pigment compositions contain oxides of Y, La, Ce, Pr, Nd, Pm, Sm, Eu, Gd, Tb, Dy, Ho, Er, Tm, Yb, Lu, Ac, Th, Pa, U, Np, Pu, Am, Cm, Bk, Cf, Es, Fm, Md, No, Lr, or combinations thereof. In another embodiment, the pigment compositions contain oxides of Ce.

The alkaline earth metal oxides, early-transition metal oxides, post-transition metal oxides, metalloid oxides, and rare-earth metal oxides are oxide compounds of the formula $E_wO_z$, wherein E is metal selected from the alkaline earth metals, early-transition metals, post-transition metals, metalloids, and rare-earth metals; O is atomic oxygen; each w and z can be independently a non-zero integer. In one embodiment, the pigment compositions contain oxides of Mg, Ca, Sr, Ba, Ti, Zr, Zn, Al, Si, B, Ce, or combinations thereof.

In one embodiment, the early-transition metal oxides, the post-transition metal oxides, metalloid oxides, or combinations thereof contain metal cations with only empty ($d^0$) full-filled d-orbitals ($d^{10}$), or no d-orbital electrons in their valence shell. In another embodiment, the alkaline earth metal oxides, the rare-earth metal oxides, or combinations thereof contain metals with no electrons in a valence shell of d orbitals.

In one embodiment, the pigment compositions contain combinations of alkaline earth metal oxides, early-transition metal oxides, post-transition metal oxides, metalloid oxides, and rare-earth metal oxides. The pigment compositions can contain particular combinations of alkaline earth metal oxides and early-transition metal oxides, combinations of alkaline earth metal oxides and post-transition metal oxides, combinations of alkaline earth metal oxides and metalloid oxides, or combinations of alkaline earth metal oxides and rare-earth metal oxides. The pigment compositions can contain combinations of early-transition metal oxides and post-transition metal oxides, combinations of early-transition metal oxides and metalloid oxides, or combinations of early-transition metal oxides and rare-earth metal oxides. The pigment compositions can contain combinations of post-transition metal oxides and rare-earth metal oxides or combinations of post-transition metal oxides and metalloid oxides.

In one embodiment, the pigment compositions can have the formula: $CuO.A_x.B_y$, where x=0.01-2; y=0.01-2; A is oxides of Sb, Bi, or combination thereof; B is oxides of Mg, Ca, Sr, Ba, Ti, Zr, Zn, Al, Si, B, Ce, or combinations thereof. In another embodiment, the pigment compositions can have the formula: $CuO.(A'_2O_3)_x.B_y$, where x=0.01-2; y=0.01-2; A' is Sb, Bi, or combination thereof; B is oxides of Mg, Ca, Sr, Ba, Ti, Zr, Zn, Al, Si, B, Ce, or combinations thereof. In yet another embodiment, B is selected from MgO, CaO, SrO, $TiO_2$, $ZrO_2$, ZnO, $SiO_2$, $B_2O_3$, $CeO_2$, or combinations thereof. In one embodiment, x=0.01-1 and y=0.01-0.4. In another embodiment, x=0.01-0.5 and y=0.01-0.3. In yet another embodiment, x=0.01-0.4 and y=0.01-0.2. In yet another embodiment, x=0.01-0.3 and y=0.01-0.1. In still yet another embodiment, x=0.05-0.5 and y=0.01-1.5. When x=0.05-0.5 and y=0.01-1.5, the pigment compositions can have a light-tone color (e.g., yellow and light green.

In one embodiment, the pigment compositions contain the copper antimony oxides, copper bismuth oxides, or combinations thereof as crystalline phases of the pigment compositions. The copper antimony oxides, copper bismuth oxides, or combinations thereof can be the crystalline phases of the pigment compositions along with other components such as copper oxides, alkaline earth metal oxides, early-transition metal oxides, post-transition metal oxides, metalloid oxides, rare-earth metal oxides, or combinations thereof. In another embodiment, the pigment compositions contain $CuSb_2O_6$ and $CuBi_2O_4$ as crystalline phases along with CuO as the major component and other oxides.

The pigment compositions contain any suitable amount of the copper antimony oxides, copper bismuth oxides, or combinations thereof and any suitable amount of the alkaline earth metal oxides, early-transition metal oxides, post-transition metal oxides, metalloid oxides, rare-earth metal oxides, or combinations thereof. The amounts of respective oxides depend on the desired implementations of the pigment compositions. In one embodiment, the pigment compositions contain copper oxides at about 50 wt % or more and about 98 wt % or less of the pigment composition; and copper antimony oxides, copper bismuth oxides, or combinations thereof at about 0.2 wt % or more and about 20 wt % or less of the pigment composition; and alkaline earth metal oxides, early-transition metal oxides, post-transition metal oxides, metalloid oxides, rare-earth metal oxides, or combinations thereof at about 0.2 wt % or more and about 20 wt % or less of the pigment composition. In another embodiment, the pigment compositions contain copper oxides at about 50 wt % or more and about 98 wt % or less of the pigment composition; copper antimony oxides, copper bismuth oxides, or combinations thereof at about 0.2 wt % or more and about 10 wt % or less of the pigment composition; and alkaline earth metal oxides, early-transition metal oxides, post-transition metal oxides, metalloid oxides, rare-earth metal oxides, or combinations thereof at about 0.2 wt % or more and about 10 wt % or less of the pigment composition. In yet another embodiment, the pigment compositions contain copper oxides at about 50 wt % or more and about 98 wt % or less of the pigment composition; copper antimony oxides, copper bismuth oxides, or combinations thereof at about 0.2 wt % or more and about 1 wt % or less of the pigment composition; and the alkaline earth metal oxides, early-transition metal oxides, post-transition metal oxides, metalloid oxides, rare-earth metal oxides, or combinations thereof at about 0.2 wt % or more and about 1 wt % or less of the pigment composition.

In one embodiment, the pigment compositions contain copper oxides at about 60 wt % or more and about 99.6 wt % or less of the pigment composition; and copper antimony oxides, copper bismuth oxides, or combinations thereof at about 0.2 wt % or more and about 20 wt % or less of the pigment composition; and alkaline earth metal oxides, early-transition metal oxides, post-transition metal oxides, metalloid oxides, rare-earth metal oxides, or combinations thereof at about 0.2 wt % or more and about 20 wt % or less of the pigment composition. In another embodiment, the pigment compositions contain copper oxides at about 80 wt % or more and about 99.6 wt % or less of the pigment composition; copper antimony oxides, copper bismuth oxides, or combinations thereof at about 0.2 wt % or more and about 10 wt % or less of the pigment composition; and alkaline earth metal oxides, early-transition metal oxides, post-transition metal oxides, metalloid oxides, rare-earth metal oxides, or combinations thereof at about 0.2 wt % or more and about 10 wt % or less of the pigment composition. In yet another embodiment, the pigment compositions contain copper oxides at about 98 wt % or more and about 99.6 wt % or less of the pigment composition; copper antimony oxides, copper bismuth oxides, or combinations thereof at about 0.2 wt % or more and about 1 wt % or less of the pigment composition; and the alkaline earth metal oxides, early-transition metal oxides, post-transition metal oxides, metalloid oxides, rare-earth metal oxides, or combinations thereof at about 0.2 wt % or more and about 1 wt % or less of the pigment composition.

In another embodiment, the pigment compositions contain any suitable amount of crystalline copper oxides and any suitable amount of amorphous (non-crystalline) oxide composites containing at least one selected from the group consisting of antimony oxides and bismuth oxides and at least one selected from the group consisting of alkaline earth metal oxides, early-transition metal oxides, post-transition metal oxides, metalloid oxides, and rare-earth metal oxides. The amounts of the crystalline copper oxides and the amorphous oxide composites depend on the desired implementations of the pigment compositions. In one embodiment, the pigment compositions contain the crystalline copper oxides at about 50 wt % or more and about 98 wt % or less of the pigment composition and the amorphous oxide composites at about 0.2 wt % or more and about 40 wt % or less of the pigment composition. In another embodiment, the pigment compositions contain the crystalline copper oxides at about 50 wt % or more and about 98 wt % or less of the pigment composition and the amorphous oxide composites at about 0.2 wt % or more and about 20 wt % or less of the pigment composition. In one embodiment, the pigment compositions contain the crystalline copper oxides at about 50 wt % or more and about 98 wt % or less of the pigment composition and the amorphous oxide composites at about 0.2 wt % or more and about 2 wt % or less of the pigment composition.

In one embodiment, the pigment compositions further contain magnesium oxides. All of the pigment compositions described herein can contain any suitable amount of magnesium oxides. In one embodiment, the pigment compositions further contain the magnesium oxides at about 10 wt % or more and about 50 wt % or less of the pigment composition. In another embodiment, the pigment compositions contain the magnesium oxides at about 15 wt % or more and about 45 wt % or less of the pigment composition. In yet another embodiment, the pigment compositions contain the magnesium oxides at about 20 wt % or more and about 40 wt % or less of the pigment composition.

In one embodiment, pigment compositions contain magnesium oxides; crystalline complex oxide composites; and amorphous oxide composites. The crystalline complex oxide composite includes at least one crystalline phase selected from the group consisting of crystalline phase of copper-magnesium-antimony oxides ($Cu_3MgSb_{1.6}O_{6-8}$ for example) and their bismuth solid solution derivatives, crystalline phase of copper antimony oxides ($CuSb_2O_6$ for example) and their bismuth solid solution derivatives, and crystalline phase of magnesium antimony oxides ($MgSb_2O_4$ or $MgSb_2O_6$ for example) and their bismuth solid solution derivatives. The crystalline complex oxide composite can be crystalline copper-antimony-bismuth-magnesium-containing oxide composites. The amorphous oxide composite includes at least one selected form the group consisting of antimony oxides and bismuth oxides and at least one selected from the group consisting of alkaline earth metal oxides, early-transition metal oxides, post-transition metal oxides, metalloid oxides (e.g., semi-metal oxides), and rare-earth metal oxides.

In one embodiment, the pigment compositions contain magnesium oxides at about 10 wt % or more and about 50 wt % or less of the pigment composition, crystalline complex oxide composites at about 50 wt % or more and about 90 wt % or less of the pigment composition, and amorphous oxide composites at about 0.2 wt % or more and about 10 wt % or less of the pigment composition. In another embodiment, the pigment compositions contain magnesium oxides at about 15 wt % or more and about 45 wt % or less of the pigment composition, crystalline complex oxide composites at about 55 wt % or more and about 85 wt % or less of the pigment composition, and amorphous oxide composites at about 0.5 wt % or more and about 9 wt % or less of the pigment composition. In yet another embodiment, the pigment compositions contain magnesium oxides at about 20 wt % or more and about 40 wt % or less of the pigment composition, crystalline complex oxide composites at about 60 wt % or more and about 80 wt % or less of the pigment composition, and amorphous oxide composites at about 1 wt % or more and about 8 wt % or less of the pigment composition.

In one embodiment, the subject pigment compositions are substantially free of at least one of the elements selected from the group consisting of chrome, lead, cadmium, mercury, nickel, and cobalt. As used herein, "substantially free of an element" means that the pigment compositions does not include the element in any form, or the element or any compounds that contain the element are not intentionally added to the pigment compositions. For example, in some embodiments, all the materials used in forming the pigment compositions are substantially free of at least one of the elements selected from the group consisting of chrome, lead, cadmium, mercury, nickel, and cobalt. In another embodiment, a method of making the pigment composition does not involve combining at least one of the elements selected from the group consisting of chrome, lead, cadmium, mercury, nickel, and cobalt with the pigment compositions and/or precursor materials of the pigment compositions.

Methods

The present invention also provides various methods for making the pigment compositions described herein. The subject pigment compositions can be made by any suitable technique, for example, by a solid state reaction or co-precipitation. Metal compounds including copper, at least one of antimony and bismuth, and at least one selected from alkaline earth metals, early-transition metals, post-transition metals, metalloid oxides, and rare-earth metals are combined. The metal compounds are reacted to form the pigment compositions.

The metal compounds can be any suitable compounds as long as the metal compounds can be reacted to form the pigment compositions. In one embodiment, the metal compounds are metal oxides, metal carbonates, metal hydroxides, metal bicarbonates, metal oxyhydroxides, metal sulfates, metal oxysulfates, metal fluorides, metal chlorides, or metal oxychlorides. For the co-precipitation technique, soluble metal compounds and/or metal salts can be used. Examples of metal compounds that can be used in the subject invention include oxides, carbonates, carbonates, hydroxides, bicarbonates, oxyhydroxides, sulfates, oxysulfates, chlorides, or oxychlorides of Cu, Sb, Bi, alkaline earth metals, early-transition metals, post-transition metals, metalloid oxides, and rare-earth metals. In one embodiment, metal compounds that can be used in the subject invention include oxides, carbonates, carbonates, hydroxides, bicarbonates, oxyhydroxides, sulfates, oxysulfates, chlorides, or oxychlorides of Cu, Sb, Bi, Mg, Ca, Sr, Ba, Ti, Zr, Zn, Al, Si, B, and Ce.

In one embodiment, the metal compounds are reacted by heating to an elevated temperature to form the pigment compositions. The reactions can be carried out in air, inert, or vacuum atmospheres. The metal compounds can be reacted by heating to a temperature of about 600° C. to about 1,200° C. for about 0.5 to about 48 hours. However, it will be understood to those practicing the invention that a wide range of temperatures and times can be used, and that so long as the temperature and length of time used is sufficient to form the pigment compositions according to the present invention, the temperature and length of time are not critical. Heating can be achieved by placing the reactants in a crucible located inside a kiln, or other suitable device to heat the reactants. Heating can also be achieved through the use of a rotary calciner or other continuous calcining methods. In another embodiment, all metal oxides except CuO can be pre-calcined to a temperature of about 1,100° C. to about 1,450° C. for about 0.5 to about 10 hours to form a glassy melt, then be cooled and ground into powder with an average particle size from 5 to 20 μm ($D_{50}$). CuO is then added and heated with those pre-made powders to a temperature of about 600° C. to about 1,200° C. for about 0.5 to about 24 hours to produce the pigment powder. In yet another embodiment, the metal compositions are formed by a two-step method. The first step involves combining at least one of antimony and bismuth and at least one selected from alkaline earth metals, early-transition metals, post-transition metals, metalloids, and rare-earth metals to form first metal compounds and heating the first metal compounds by a solid state reaction to a temperature of about 1,100° C. to about 1,300° C. to form an oxide composite. The second step involves combining copper oxides with the oxide composite to form a second metal compounds and heating the second metal compounds by a solid state reaction to a temperature of about 600° C. to about 1,200° C. to form the pigment composition.

In another embodiment, the metal compounds are reacted by co-precipitation to form a pigment composition. The metal compounds are dissolved in a liquid such as distilled water, and the solution is added to another aqueous solution of a co-precipitant such as sodium hydroxide, sodium carbonate, ammonium hydroxide, and ammonium hydrogen carbonate. During the co-precipitation process, the temperature of the solution can be kept at about 40° C. to about 70° C. In one embodiment, the co-precipitated powders are filtered and dried. In another embodiment, the co-precipitated powders are heated to a temperature of about 600° C. to about 1,200° C. for about 0.5 to about 48 hours in air or in an oxygen-containing atmosphere. Heating can be achieved as described above.

In one embodiment, the pigment compositions are milled or ground. When a smaller average particle size is desired or when a particular application requires avoidance of minor particle agglomerations, milling or grinding of the pigment compositions can be performed. In one embodiment, at least 90% of the particles of the pigment compositions have an average particle size of about 0.2 μm or more and about 15 μm or less. In another embodiment, at least 90% of the particles of the pigment compositions have an average particle size of about 0.3 μm or more and about 3 μm or less.

Reflectance

One advantage of the subject invention is that the pigment compositions can exhibit improved reflectance or reflection properties (the terms "reflectance" and "reflection" are used interchangeably herein). Such improvements can be observed by improvements in infrared (IR) reflectance or improvements in solar reflectance (or more specifically, total solar reflectance (TSR)). As will be appreciated by those skilled in the art, total solar reflectance is the amount of reflected energy in the ultraviolet, visible and near infrared region of the solar spectrum divided by the total amount of incident solar energy.

In one embodiment, the pigment compositions exhibit a total solar reflectance of about 15% or more. In another embodiment, the pigment compositions exhibit a total solar reflectance of about 18% or more. In yet another embodiment, the pigment compositions exhibit a total solar reflectance of about 20% or more.

The light-tone color pigment compositions can exhibit a higher solar reflectance than the dark-tone color pigment compositions. In one embodiment, the light-tone color pigment compositions exhibit a total solar reflectance of about 35% or more. In another embodiment, the light-tone color pigment compositions exhibit a total solar reflectance of about 40% or more. In yet another embodiment, the pigment compositions exhibit a total solar reflectance of about 45% or more.

In one embodiment, the pigment composition exhibits an average reflection of about 30% or more for light having a wavelength between 1300 and 1600 nm. In another embodiment, the pigment composition exhibits an average reflection of about 35% or more for light having a wavelength between 1300 and 1600 nm. In yet another embodiment, the pigment composition exhibits an average reflection of about 40% or more for light having a wavelength between 1300 and 1600 nm.

As noted, the subject pigment compositions can exhibit improved solar reflectance properties such that the pigment compositions reflect a relatively high proportion of light having a wavelength between 780 and 2500 nm, while not significantly reflecting a relatively low proportion of light having a wavelength between 250 and 780 nm. In one embodiment, the pigment composition exhibits an average reflection of about 20% or less for light having a wavelength between 380 nm and 780 nm, and the pigment compositions exhibit an average reflection of about 20% or more for light having a wavelength between 780 nm and 2500 nm. In another embodiment, the pigment compositions exhibit an average reflection of about 15% or less for light having a wavelength between 380 nm and 780 nm, and the pigment composition exhibits an average reflection of about 25% or more for light having a wavelength between 780 nm and 2500 nm. In yet another embodiment, the pigment composition exhibits an average reflection of about 10% or less for light having a wavelength between 380 nm and 780 nm, and the pigment composition exhibits an average reflection of about 30% or more for light having a wavelength between 780 nm and 2500 nm. The pigment compositions can have a dark-tone color such as black.

In one embodiment, the light-tone color pigment compositions exhibit a higher average reflection for light having a wavelength between 380 nm and 780 nm and/or for light having a wavelength between 780 nm and 2500 nm than the dark-tone color pigment compositions. In one embodiment, the light-tone color pigment compositions exhibit an average reflection of about 30% or more for light having a wavelength between 380 nm and 780 nm and an average reflection of about 50% or more for light having a wavelength between 780 nm and 2500 nm. In another embodiment, the light-tone color pigment compositions exhibit an average reflection of about 35% or more for light having a wavelength between 380 nm and 780 nm and an average reflection of about 55% or more for light having a wavelength between 780 nm and 2500 nm. In yet another embodiment, the light-tone color pigment compositions exhibit an average reflection of about 40% or more for light having a wavelength between 380 nm and 780 nm and an average reflection of about 60% or more for light having a wavelength between 780 nm and 2500 nm.

As explained in detail below in the results of various testing, these various reflection measurements are taken when the pigment material is in a pressed cup form. This testing method is also referred to herein as "Dry Pressed Powder" (DPP) testing method which is described in detail in U.S. Pat. No. 6,174,360 to Sliwinski et al. Another testing technique, described in detail in the results of testing herein, involves incorporating the pigment compositions in an alkyd melamine (AM) paint system.

Significant energy cost savings can be achieved by use of the present invention pigment compositions which exhibit the noted solar reflectance properties. Specifically, although the extent of solar reflectance of paints and coatings depends upon numerous factors; generally for many building applications, increasing total solar reflectance by only 1% can result in significant annual savings. A case study describing metal roofing containing infrared reflective pigment compositions is provided in "Cool Metal Roofing Case Study" available from the Cool Metal Roofing Coalition of Pittsburgh, Pa.

It will be appreciated that pigment compositions according to the invention are mixed metal oxide pigments. As used herein, a "mixed metal oxide pigment" (MMO pigment) is a pigment having a crystal structure that includes two or more types of metal atoms and oxygen atoms. Such pigment compositions are known as complex inorganic colored pigments (CICP) and can be used in applications where traditional mixed metal oxide pigments are used. For example, pigment compositions according to the invention could be used to provide visual effects (e.g., color modification) in glass materials including generally, vitreous inorganic materials, such as bulk glasses, glazes and/or glass enamels. Accordingly, one aspect of the invention can provide a substrate with a coating including the pigment composition, wherein the substrate is selected from the group consisting of metal, glass, enamel, or ceramic. The pigment compositions according to the invention could be used to color a bulk object composed of an organic resin.

The pigment compositions according to the invention would likely be suitable for use in the preparation of protective layers for preventing corrosion of metallic substrates. The pigment compositions could be added to cements, plasters, or stuccos, either in bulk or in surface treatments, to provide visual effects. The pigment compositions according to the invention could be used to produce inks, particularly inks that can exhibit improved solar reflectance properties. The inks reflect a relatively high proportion of light having a wavelength between 780 and 2500 nm, while reflecting a relatively low proportion of light having a wavelength between 250 and 780 nm, which shows either light-tone or dark-tone colors. That is, the inks can reflect infrared (IR) radiation while not significantly reflecting light within the visible spectrum. Thus, the inks can maintain their desired appearance and color, e.g., dark-tone color, black color, or light-tone color, while also reflecting significant amounts of IR radiation Other potential uses of the pigment compositions could be as data storage substrates, as couplers for microwave radiation, and as absorbers for electromagnetic radiation. Accordingly, an embodiment of the invention is a method of absorbing electromagnetic radiation comprising: applying to a substrate a formulation comprising, prior to firing or curing, a pigment composition, firing or curing the mixture to produce a pigment coating on the substrate, and exposing the pigment coating to electromagnetic radiation. In a preferred embodiment, the method involves the pigment coating absorbing radiation having a wavelength shorter than 400 nm, and in a more preferred embodiment, the method involves the pigment coating absorbing ultraviolet radiation.

Testing

In order to further assess the various aspects and benefits of the present invention, a series of investigations are undertaken to evaluate the reflectance properties of pigment composition containing copper antimony oxides, copper bismuth oxides, or combinations thereof and alkaline earth metal oxides, early-transition metal oxides, post-transition metal oxides, metalloid oxides, rare-earth metal oxides, or combinations thereof. The reflectance of the pigment compositions is measured over a range of light wavelengths that included both the visible spectrum and the infrared (IR) spectrum. The results of these investigations are shown in Tables 1 and 2, and FIGS. 1-5.

The raw materials used are copper oxide (CuO or $Cu_2O$), antimony oxide ($Sb_2O_3$ or $Sb_2O_5$), bismuth oxide ($Bi_2O_3$), and other metal oxides as indicated in Tables below. Metal carbonates, metal hydroxide and metal nitrates can also be used as the raw materials for this work. The powders of each are weighed at molar ratios as indicated in Tables. After weighing the various raw batches, they are lab blended for 2 minutes using an Osterizer blender. Once homogenized after blending, the individual raw batches are placed into cordierite crucibles and fired in air at a temperature in the range from about 600° C. to about 1,200° C. at about 2 to 48 hours. Fifty grams of the calcined pigment composition is placed into a specimen mill with water and allowed to mill on a mechanical roll rack for 30 minutes. After milling, the pigment composition is separated from water by filtration. After separating the water from the pigment composition, the pigment composition is placed on a drying dish and allowed to dry in a drying oven at about 150° C. for approximately 2 hours.

For testing tint color, the pigment composition is evaluated in rigid polyvinyl chloride (RPVC) resin at a loading of test pigment composition to titania of 1:4 for color purposes. The resin is dispersed using a Two-Roll mill as known in the art.

For evaluating mass-tone color, the pigment composition is tested in an alkyd melamine paint. To aid in the dispersion of the pigment composition in the paint solvent, glass beads are used and mixing is performed on a mechanical shaker for 30 minutes. After 30 minutes of shaking, the dispersion is separated from the glass media by gravity filtration through a paint strainer. Then the paint is drawn down onto a Leneta card and allowed to cure in a drying oven at about 80° C. for about 45 minutes. After curing, color and total solar reflectance are measured. Solar reflectance is measured and is indicated according to ASTM test number E903.

For total solar reflectance, the pigment composition is tested and evaluated by a media-free (or, media-independent) "Dry Pressed Powder" (DPP) testing method for total solar reflectance as described in U.S. Pat. No. 6,174,360 to Sliwinski et al. As described in that patent, dry pigment composition samples are measured on a neat pressed cup powder sample using a Perkin Lambda 19 Spectrophotometer equipped with a Labsphere RSA-PE-19 reflectance spectroscopy accessory at a wavelength of 2.5 μm.

Example 1

In this series of trials, pigment compositions having the formula CuO—$(Sb_2O_3)$x-By are used. The compound B and the values of x and y are indicated in Table 1. Comparative compositions are CuO, as-is, and CuO, calcined. The CuO, as-is, represents a copper oxide without calcination. The CuO, calcined, represents a copper oxide with calcination in air at a temperature in the range from 600° C. to 1,200° C. at about 2 to 48 hours.

TABLE 1

Color and reflectance for CuO—$(Sb_2O_3)$x—By formulation
CuO—$(Sb_2O_3)$x—By Formulation

| Compositions | X | B | Y | L* | a* | b* | TSR % |
|---|---|---|---|---|---|---|---|
| CuO, as-is | — | — | — | 28.51 | 0.73 | 0.57 | 12.3 |
| CuO, calcined | — | — | — | 27.8 | 0 | −1.07 | 13 |
| Trial # 1 | 0.02 | $B_2O_3$ | 0.03 | 27.58 | 0.56 | −0.22 | 19.5 |
| Trial # 2 | 0.04 | $SiO_2$ | 0.03 | 27.88 | 0.57 | −0.18 | 17.3 |
| Trial # 3 | 0.06 | ZnO | 0.03 | 28.09 | 0.56 | −0.24 | 17.1 |
| Trial # 4 | 0.1 | $ZrO_2$ | 0.03 | 28.39 | 0.57 | −0.33 | 16.9 |
| Trial # 5 | 0.1 | MgO | 0.05 | 28.76 | 0.49 | −0.27 | 15.9 |
| Trial # 6 | 0.1 | MgO | 0.1 | 28.83 | 0.48 | −0.34 | 17.9 |
| Trial # 7 | 0.1 | $TiO_2$ | 0.02 | 28.82 | −0.09 | 0.51 | 21.4 |
| Trial # 8 | 0.1 | $TiO_2$ | 0.04 | 28.51 | 0.32 | 0.65 | 17.9 |
| Trial # 9 | 0.1 | $TiO_2$ | 0.06 | 27.97 | 0.28 | 0.31 | 17.2 |
| Trial # 10 | 0.1 | $TiO_2$ | 0.08 | 29.28 | 1.06 | 2.11 | 17.6 |
| Trial # 11 | 0.05 | $TiO_2/SiO_2$ | 0.05 | 27.01 | 0.39 | −0.5 | 17.3 |
| Trial # 12 | 0.10 | $TiO_2/SiO_2$ | 0.05 | 26.96 | 0.27 | −0.65 | 16.1 |
| Trial # 13 | 0.15 | $TiO_2/SiO_2$ | 0.05 | 26.9 | 0.33 | −0.59 | 15.7 |
| Trial # 14 | 0.20 | $TiO_2/SiO_2$ | 0.05 | 27.12 | 0.38 | −0.55 | 16 |
| Trial # 15 | 0.1 | $TiO_2/MgO$ | 0.08 | 28.56 | −0.02 | 0.46 | 19 |
| Trial # 16 | 0.1 | $TiO_2/MgO$ | 0.05 | 28.45 | 0 | 0.3 | 18.3 |
| Trial # 17 | 0.05 | MgO | 1 | 37.88 | −0.21 | 9.35 | 19.1 |
| Trial # 18 | 0.1 | MgO | 1 | 47.86 | 3.58 | 19.95 | 28.2 |
| Trial # 19 | 0.15 | MgO | 1 | 63.67 | 15 | 35.25 | 50.6 |
| Trial # 20 | 0.2 | MgO | 1 | 69.01 | 8.03 | 33.36 | 49.6 |

Table 1 also shows measured mass-tone color and total solar reflectance values in Alkyd Melamine paint. Table 1 demonstrates that higher % TSR is achieved by having the formula CuO—$(Sb_2O_3)$x-By while generally maintaining the same color characteristics as the controls that is formulated without the use of addition of other metal oxides such as $Sb_2O_3$, MgO, $TiO_2$, $ZrO_2$, ZnO, $SiO_2$, and $B_2O_3$.

Example 2

In this series of trials, pigment compositions having the formula CuO—$(Bi_2O_3)$x-By are used. The compound B and the values of x and y are indicated in Table 2. Comparative compositions are CuO, as-is, and CuO, calcined.

TABLE 2

Color and reflectance for CuO—$(Bi_2O_3)$x—By formulation
CuO—$(Bi_2O_3)$x—By Formulation

| Compositions | X | B | Y | L* | a* | b* | TSR % |
|---|---|---|---|---|---|---|---|
| CuO, as-is | — | — | — | 28.51 | 0.73 | 0.57 | 12.3 |
| CuO, calcined | — | — | — | 27.8 | 0 | −1.07 | 13 |
| 21 | 0.1 | $B_2O_3$ | 0.03 | 27.36 | 0.2 | −0.89 | 18.3 |
| 22 | 0.15 | $SiO_2$ | 0.03 | 27.44 | 0.17 | −0.92 | 17.2 |
| 23 | 0.2 | ZnO | 0.03 | 27.49 | 0.15 | −0.87 | 17.2 |
| 24 | 0.25 | $ZrO_2$ | 0.03 | 27.58 | 0.16 | −0.83 | 16.5 |
| 25 | 0.1 | MgO | 0.05 | 32.31 | 1.6 | 2.37 | 20.4 |
| 26 | 0.1 | $CeO_2$ | 0.05 | 32.18 | 1.6 | 2.31 | 20 |
| 27 | 0.1 | $TiO_2$ | 0.02 | 26.93 | 0.13 | −0.84 | 19.1 |
| 28 | 0.1 | $TiO_2$ | 0.04 | 27.52 | 0.21 | −0.74 | 19.3 |
| 29 | 0.1 | $TiO_2$ | 0.06 | 27.88 | 0.2 | −0.68 | 19.5 |
| 30 | 0.1 | $TiO_2$ | 0.08 | 28.55 | 0.25 | −0.41 | 20.1 |

Table 2 also shows measured mass-tone color and total solar reflectance values. Table 2 demonstrates that higher % TSR is achieved by having the formula CuO—$(Bi_2O_3)$x-By while generally maintaining the same color characteristics as the controls that is formulated without the use of addition of other metal oxides such as $B_2O_3$, MgO, $TiO_2$, $ZrO_2$, ZnO, $SiO_2$, and $CeO_2$.

Example 3

In this investigation, four pigment compositions having the formula CuO—$(Sb_2O_3)$x-By are prepared. The reflectance of the pigment compositions is measured over a range of light wavelengths that included both the visible spectrum and the infrared (IR) spectrum. The reflectance testing results are presented in FIG. 1. "Trial #7" in FIG. 1 stands for a pigment composition having the formula CuO—$(Sb_2O_3)$x-By where B is $TiO_2$, x is 0.1, and y is 0.02. "Trial #8" in FIG. 1 stands for a pigment composition having the formula CuO—$(Sb_2O_3)$x-By where B is $TiO_2$, x is 0.1, and y is 0.04. "Trial #9" in FIG. 1 stands for a pigment composition having the formula CuO—$(Sb_2O_3)$x-By where B is $TiO_2$, x is 0.1, and y is 0.06. "Trial #10" in FIG. 1 stands for a pigment composition having the formula CuO—$(Sb_2O_3)$x-By where B is $TiO_2$, x is 0.1, and y is 0.08.

Figure 1:
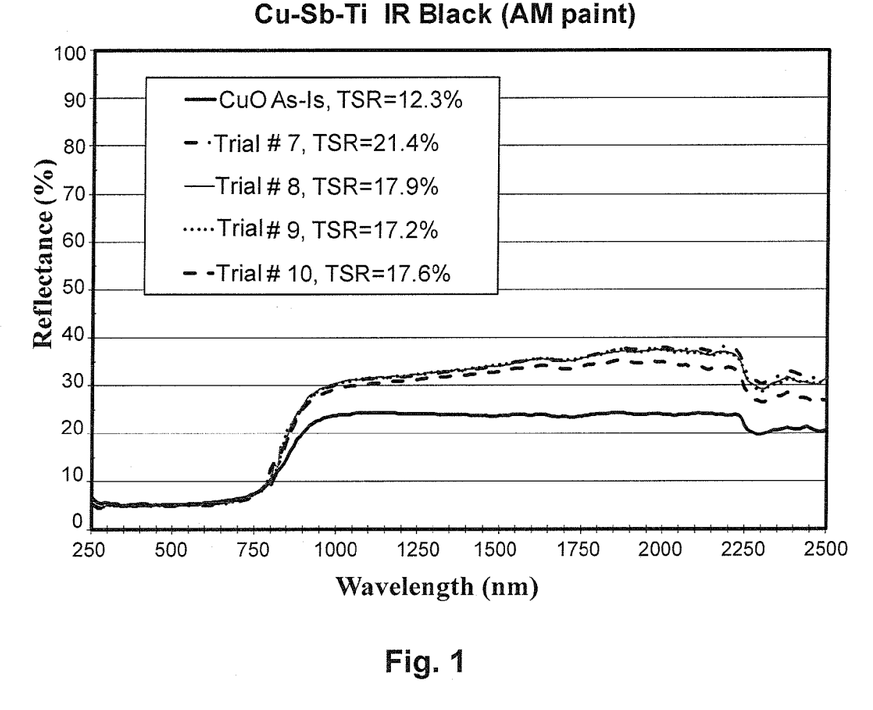
FIG. 1 is a graph of reflectance values for pigment compositions having the formula $CuO$—$(Sb_2O_3)_x$—$(TiO_2)_y$.

FIG. 1 shows that the pigment compositions containing antimony oxides and titania exhibit nearly identical reflectance curves as the composition that does not contain antimony oxides and titania, i.e., the CuO, as-is, pigment, within the visible spectrum, e.g., 250 nm to 700 nm, and particularly in the range of 400 nm to 600 nm. However, for light in the IR spectrum, e.g., between 780 nm and 2,500 nm and preferably between 1,300 nm and 1,600 nm, the pigment compositions containing antimony oxides and titania exhibit significantly greater reflectance values than the pigment composition that does not contain antimony oxides and titania. Specifically, at a wavelength of 1,500 nm, the pigment composition that does not contain antimony oxides and titania exhibits a reflectance of about 24%, while pigment compositions formed in the presence of antimony oxides and titania exhibit reflectance values of about 33% to about 35%. This data demonstrates the remarkable IR reflecting performance and consistent color qualities of the preferred pigment compositions according to the present invention.

Example 4

In this investigation, four pigment compositions having the formula $CuO$—$(Sb_2O_3)x$-$(TiO_2/SiO_2)y$ are prepared. The reflectance of the pigment compositions is measured over a range of light wavelengths that included both the visible spectrum and the infrared (IR) spectrum. The reflectance testing results are presented in FIG. 2. "Trial #11" in FIG. 2 stands for a pigment composition having the formula $CuO$—$(Sb_2O_3)x$—$(TiO_2/SiO_2)y$ where x is 0.05 and y is 0.05. "Trial #12" in FIG. 2 stands for a pigment composition having the formula $CuO$—$(Sb_2O_3)x$—$(TiO_2/SiO_2)y$ where x is 0.10 and y is 0.05. "Trial #13" in FIG. 2 stands for a pigment composition having the formula $CuO$—$(Sb_2O_3)x$—$(TiO_2/SiO_2)y$ where x is 0.15 and y is 0.05. "Trial #14" in FIG. 2 stands for a pigment composition having the formula $CuO$—$(Sb_2O_3)x$—$(TiO_2/SiO_2)y$ where x is 0.20 and y is 0.05. For the $TiO_2/SiO_2$ part, the molar ratio of Ti:Si is 1:1, y=0.05, which is 5%.

Figure 2:
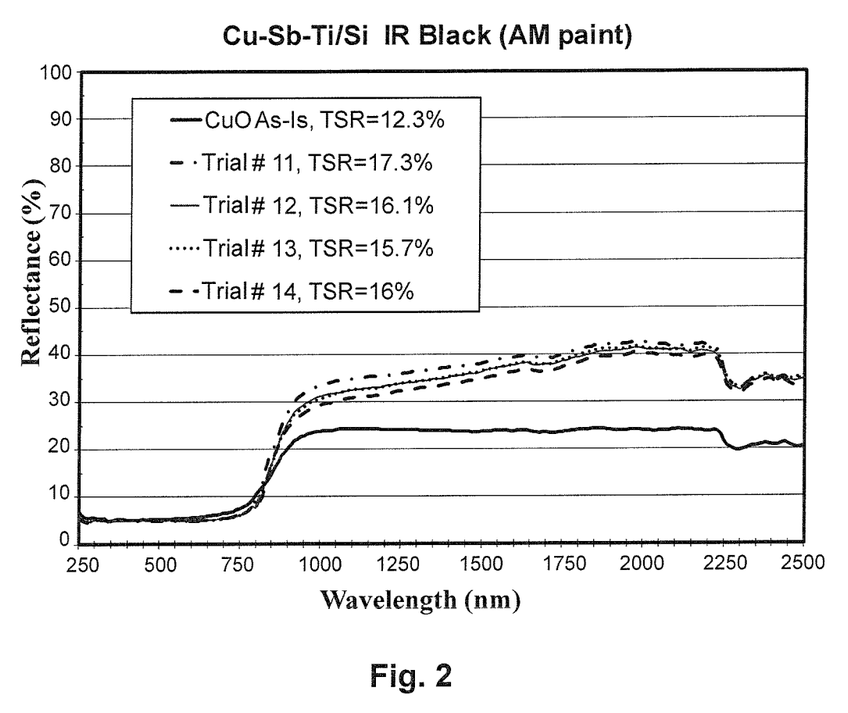
FIG. 2 is a graph of reflectance values for pigment compositions having the formula $CuO$—$(Sb_2O_3)_x$—$(TiO_2/SiO_2)_y$.

FIG. 2 shows that the pigment compositions containing antimony oxides, titanium oxides and silicon oxides exhibit nearly identical reflectance curves as the composition that does not contain antimony oxides, titanium oxides and silicon oxides, i.e., the CuO, as-is, pigment, within the visible spectrum, e.g., 250 nm to 700 nm, and particularly in the range of 400 nm to 600 nm. However, for light in the IR spectrum, e.g., between 780 nm and 2,500 nm and preferably between 1,300 nm and 1,600 nm, the pigment compositions containing antimony oxides, titanium oxides, and silicon oxides exhibit significantly greater reflectance values than the pigment composition that does not contain antimony oxides, titanium oxides and silicon oxides. Specifically, at a wavelength of 1,500 nm, the pigment composition that does not contain antimony oxides, titanium oxides, and silicon oxides exhibits a reflectance of about 24%, while pigment compositions formed in the presence of antimony oxides, titanium oxides and silicon oxides exhibit reflectance values of about 35% to about 38%. This data demonstrates the remarkable IR reflecting performance and consistent color qualities of the preferred pigment compositions according to the present invention.

Example 5

In this investigation, two pigment compositions having the formula $CuO$—$(Sb_2O_3)x$—$(TiO_2/MgO)y$ are prepared. The reflectance of the pigment compositions is measured over a range of light wavelengths that included both the visible spectrum and the infrared (IR) spectrum. The reflectance testing results are presented in FIG. 3. "Trial #15" in FIG. 3 stands for a pigment composition having the formula $CuO$—$(Sb_2O_3)_{0.1}$—$(TiO_2/MgO)_{0.08}$. "Trial #16" in FIG. 3 stands for a pigment composition having the formula $CuO$—$(Sb_2O_3)_{0.1}$—$(TiO_2/MgO)_{0.05}$. For the $TiO_2/MgO$ part, the molar ratio of Ti:Mg is 1:1, y=0.05 or 0.08.

Figure 3:
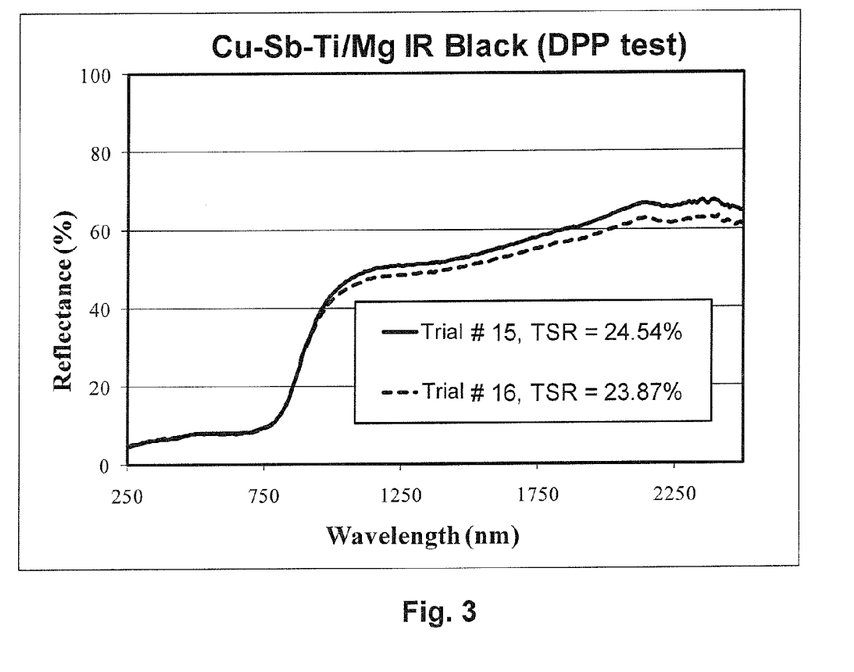
FIG. 3 is a graph of reflectance values for pigment compositions having the formula $CuO$—$(Sb_2O_3)_x$—$(TiO_2/MgO)_y$.

FIG. 3 shows that the pigment compositions containing antimony oxides, titanium oxides, and magnesium oxides exhibit significantly greater reflectance values. Specifically, at a wavelength of 1,500 nm, the pigment composition formed in the presence of antimony oxides, titanium oxides, and magnesium oxides exhibit reflectance values of about 50% to about 53%, and a TSR of 23.7% and a TSR of 24.54%. This data demonstrates the remarkable IR reflecting performance and consistent color qualities of the preferred pigment compositions according to the present invention.

Example 6

In this investigation, four pigment compositions having the formula $CuO$—$(Sb_2O_3)x$-$By$ are prepared. The four pigment compositions have a light-tone color e.g., yellow and/or light green. The reflectance of the yellow and greenish pigment compositions is measured over a range of light wavelengths that included both the visible spectrum and the infrared (IR) spectrum. "Trial #17" is a pigment composition having the formula $CuO$—$(Sb_2O_3)x$-$By$ where B is MgO, x is 0.05, and y is 1. "Trial #18" is a pigment composition having the formula $CuO$—$(Sb_2O_3)x$-$By$ where B is MgO, x is 0.10, and y is 1. "Trial #19 is a pigment composition having the formula $CuO$—$(Sb_2O_3)x$-$By$ where B is MgO, x is 0.15, and y is 1. A typical DPP reflectance spectra of Trial #19 is presented in FIG. 4. "Trial #20" is a pigment composition having the formula $CuO$—$(Sb_2O_3)x$-$By$ where B is MgO, x is 0.2, and y is 1. Table 1 also shows measured mass-tone color and total solar reflectance values of four yellow and green pigment compositions measured in Alkyd melamine paint system.

Figure 4:
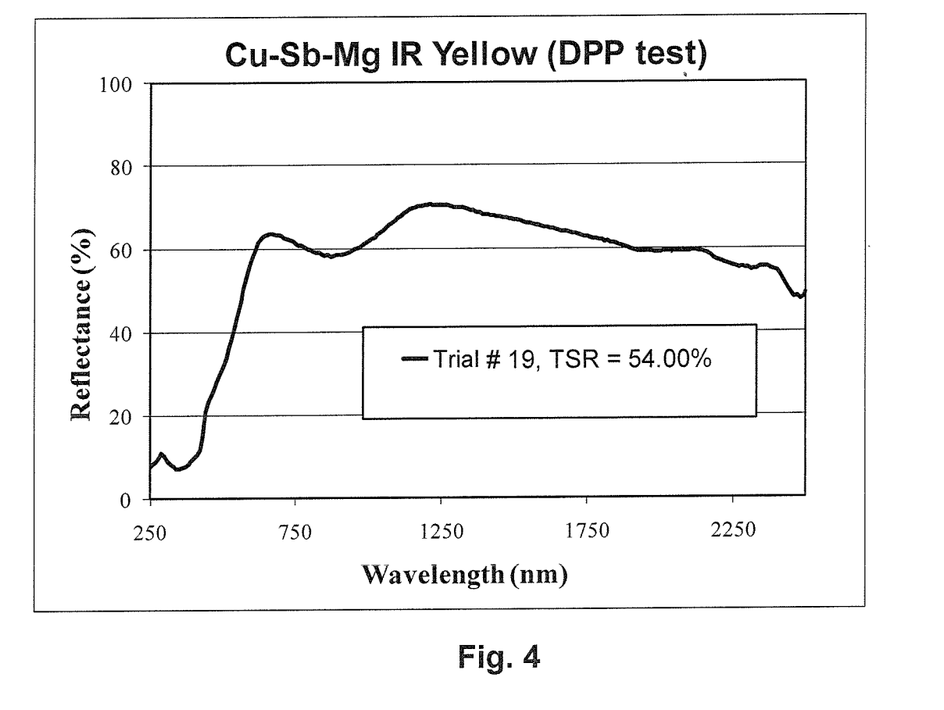
FIG. 4 is a graph of reflectance values for pigment compositions having the formula $CuO$—$(Sb_2O_3)_x$—$(MgO)_y$.

FIG. 4 shows the pigment composition (Trial #19) containing copper oxide, antimony oxides and magnesium oxides exhibit yellow color and significantly greater reflectance values measured by DPP method. Specifically, at a broad wavelength ranged from 550 to 2500 nm, the pigment composition formed in the presence of copper, antimony and magnesium oxides exhibit reflectance values of about 45% to about 70%, which results to a TSR of 54%. This is another example demonstrates the remarkable IR reflecting performance and a yellow hue in color for the preferred pigment compositions according to the present invention.

Example 7

In this investigation, four pigment compositions having the formula $CuO$—$(Bi_2O_3)x$-$By$ are prepared. The reflectance of the pigment compositions is measured over a range of light wavelengths that included both the visible spectrum and the infrared (IR) spectrum. The reflectance testing results are presented in FIG. 5. "Trial #27" in FIG. 5 stands for a pigment composition having the formula $CuO$—$(Bi_2O_3)x$-$By$ where B is $TiO_2$, x is 0.1, and y is 0.02. "Trial #28" in FIG. 5 stands for a pigment composition having the formula $CuO$—$(Bi_2O_3)x$-$By$ where B is $TiO_2$, x is 0.1, and y is 0.04. "Trial #29" in FIG. 5 stands for a pigment composition having the formula $CuO$—$(Bi_2O_3)x$-$By$ where B is $TiO_2$, x is 0.1, and y is 0.06. "Trial #30" in FIG. 5 stands for a pigment composition having the formula $CuO$—$(Bi_2O_3)x$-$By$ where B is $TiO_2$, x is 0.1, and y is 0.08.

Figure 5:
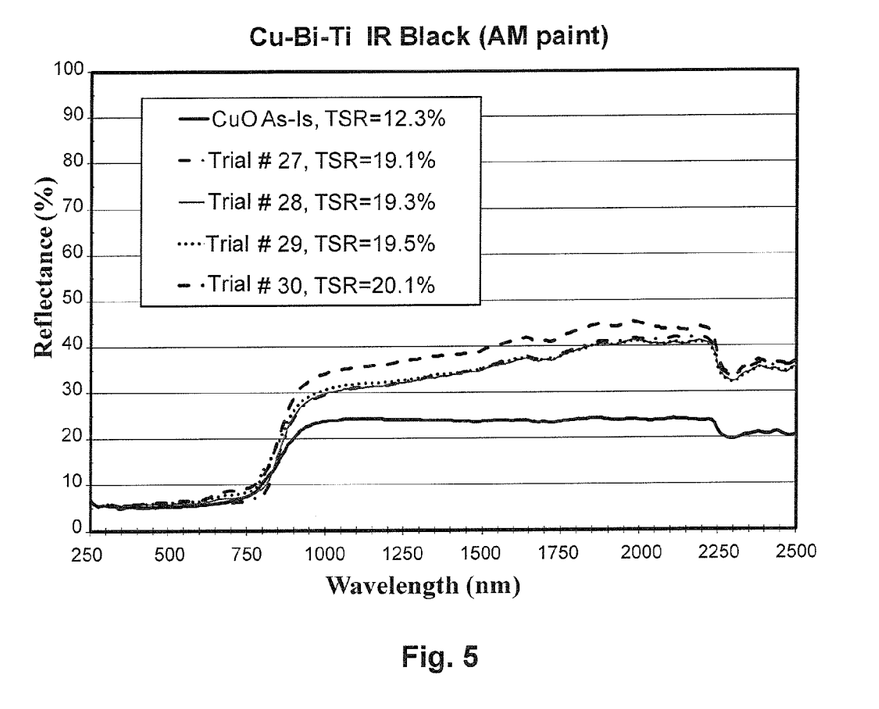
FIG. 5 is a graph of reflectance values for pigment compositions having the formula $CuO$—$(Bi_2O_3)_x$—$(TiO_2)_y$.

FIG. 5 shows that the pigment compositions containing bismuth oxides and titania exhibit nearly identical reflectance curves as the composition that does not contain bismuth oxides and titania, i.e., the CuO, as-is, pigment, within the visible spectrum, e.g., 250 nm to 700 nm, and particularly in the range of 400 nm to 600 nm. However, for light in the IR spectrum, e.g., between 780 nm and 2,500 nm and preferably between 1,300 nm and 1,600 nm, the pigment compositions containing bismuth oxides and titania exhibit significantly greater reflectance values than the pigment composition that does not contain bismuth oxides and titania. Specifically, at a wavelength of 1,500 nm, the pigment composition that does not contain bismuth oxides and titania exhibits a reflectance of about 24%, while pigment compositions formed in the presence of bismuth oxides and titania exhibit reflectance values of about 33% to about 38%. This data demonstrates the remarkable IR reflecting performance and consistent color qualities of the preferred pigment compositions according to the present invention.

The results of Examples 1-7 demonstrate that significant improvements in total solar reflectance can be achieved for copper oxide based pigment compositions by incorporation of antimony oxides or bismuth oxides, and certain metal oxides selected from alkaline earth metal oxides, early-transition metal oxides, post-transition metal oxides, metalloid oxides, and rare-earth metal oxides. Generally, when using antimony oxides or bismuth oxides, and the other metal oxides as an additive, improvements in total solar reflectance can range up to about 15% or more. That is, for a control pigment composition containing copper oxides, as-is, by incorporating antimony oxides or bismuth oxides, and certain metal oxides selected from alkaline earth metal oxides, early-transition metal oxides, post-transition metal oxides, metalloid oxides, and rare-earth metal oxides as described herein, solar reflectance of the treated pigment composition can be increased by up to another 15 percentage units, and typically at least 5% and often in the range of 5% to 10%. These increases in solar reflectance can lead to significant energy cost savings if the pigment compositions are incorporated in coatings or other paint formulations.

All patents, published applications, standards, and articles noted herein are hereby incorporated by reference in their entirety.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the terms "contain," "have," "include," and "involve" are used in either the detailed description or the claims, such terms are intended to be inclusive in a manner similar to the term "comprising" as "comprising" is interpreted when employed as a transitional word in a claim. In some instances, however, to the extent that the terms "contain," "have," "include," and "involve" are used in either the detailed description or the claims, such terms are intended to be partially or entirely exclusive in a manner similar to the terms "consisting of" or "consisting essentially of" as "consisting of" or "consisting essentially of" are interpreted when employed as a transitional word in a claim.

What is claimed is:

1. A colored pigment composition comprising a mixed metal oxide pigment having a crystal structure that includes two or more types of metal atoms and oxygen atoms, and is of the formula:

$$CuO.(A)_x.(B)_y,$$

where x=0.01-2; y=0.01-2; A is antimony oxides, bismuth oxides, or combinations thereof; B is oxides of Mg, Ca, Sr, Ba, Ti, Zr, Zn, Al, Si, B, Ce, or combinations thereof wherein the pigment composition exhibits an average reflection of about 20% or less for light having a wavelength between 380 nm and 780 nm, and the pigment composition exhibits an average reflection of about 20% or more for light having a wavelength between 780 nm and 2500 nm and wherein the pigment composition is in a powder form having an average particle size of about 0.2 μm or more and about 15 μm or less.

2. The pigment composition of claim 1, wherein A is $Sb_2O_3$, $Sb_2O_5$, $Bi_2O_3$, or combinations thereof.

3. The pigment composition of claim 1, wherein B is MgO, CaO, SrO, $TiO_2$, $ZrO_2$, ZnO, $SiO_2$, $B_2O_3$, $CeO_2$, or combinations thereof.

4. The pigment composition of claim 1, wherein the pigment composition exhibits an average reflection of about 30% or more for light having a wavelength between 1,300 and 1,600 nm.

5. The pigment composition of claim 1, wherein the oxides of Mg, Ca, Sr, Ba, Ti, Zr, Zn, Al, Si, B, Ce, or combinations thereof contain metal cations comprising a valence shell with only empty ($d^0$), full-filled d-orbitals ($d^{10}$), or no d-orbital electrons.

6. The pigment composition of claim 1, wherein the pigment composition exhibits a total solar reflectance of about 15% of more.

* * * * *